US012763837B1

(12) United States Patent
Wanner et al.

(10) Patent No.: US 12,763,837 B1
(45) Date of Patent: Oct. 13, 2026

(54) SYSTEM FOR TIME DOMAIN RECEIVE CHANNELIZATION

(71) Applicant: AMAZON TECHNOLOGIES, INC., Seattle, WA (US)

(72) Inventors: Shannon L. Wanner, Monroe, WA (US); Kyle Regan Myers, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 18/973,936

(22) Filed: Dec. 9, 2024

(51) Int. Cl.
*H04B 7/06* (2006.01)
*H04B 7/08* (2006.01)

(52) U.S. Cl.
CPC .......... *H04B 7/063* (2013.01); *H04B 7/0617* (2013.01); *H04B 7/0845* (2013.01)

(58) Field of Classification Search
CPC ... H04B 7/00; H04B 7/02; H04B 7/04; H04B 7/06; H04B 7/0613; H04B 7/0615; H04B 7/0619; H04B 7/0621; H04B 7/063; H04B 7/0617; H04B 7/08; H04B 7/0837; H04B 7/0842; H04B 7/0845; H04B 7/086; H04B 7/0865; H04B 7/0882; H04B 7/0885; H04B 7/0888
See application file for complete search history.

(56) References Cited

U.S. PATENT DOCUMENTS 7,675,985 B1 * 3/2010 Watson ................. H04L 5/0044 370/464
7,876,869 B1 * 1/2011 Gupta .................... H04B 1/109 455/150.1

(Continued)

OTHER PUBLICATIONS

"Application of Kuiper Systems LLC for Authority to Launch and Operate a Non-Geostationary Satellite Orbit System in Ka-band Frequencies", Technical Appendix, 74 pgs. Retrieved from the Internet: URL: https://fcc.report/IBFS/SAT-LOA-20190704-00057/1773885.

(Continued)

*Primary Examiner* — James M Perez
(74) *Attorney, Agent, or Firm* — Athorus. PLLC

(57) ABSTRACT

A channel processing module (CPM) accepts digital raw samples of analog signals acquired by a phased array antenna. An oversampling channelizer oversamples by two times the raw samples and provides channel samples for each channel. One stream of channel samples may be downsampled by two times with the resulting samples processed by a beamformer algorithm to provide narrow channel beamformed samples representative of a narrow channel waveform. Two streams of channel samples may be processed using respective frequency translators that translate input samples by ±¼ the sampling frequency without multiplication, with the results being added to provide reconstructed samples that represent a wide channel waveform. The reconstructed samples may be processed by a beamformer algorithm to determine wide channel reconstructed samples. In other implementations, at least some operations may be performed after operation of the beamformer algorithms. The CPM and beamformer algorithm may be executed by a digital signal processor.

20 Claims, 8 Drawing Sheets

(56) References Cited

U.S. PATENT DOCUMENTS

| | | | | |
|---|---|---|---|---|
| 8,254,481 | B1 * | 8/2012 | McCloskey | H04K 3/224 455/562.1 |
| 8,761,280 | B1 * | 6/2014 | Harris | H04L 27/28 375/259 |
| 9,350,402 | B1 * | 5/2016 | Corbalis | H04B 1/123 |
| 10,637,707 | B2 * | 4/2020 | Kim | H04L 27/2649 |
| 11,121,680 | B1 * | 9/2021 | Ma | H03F 3/195 |
| 11,563,454 | B1 * | 1/2023 | Sharma | H03M 1/0629 |
| 11,563,617 | B2 * | 1/2023 | Harris | H04L 27/2605 |
| 11,605,887 | B1 * | 3/2023 | Sharma | H04B 7/18515 |
| 11,677,145 | B1 * | 6/2023 | Sharma | H01Q 3/2682 342/372 |
| 11,831,356 | B1 * | 11/2023 | Ramachandran | H04B 17/12 |
| 12,040,557 | B1 * | 7/2024 | Sharma | H01Q 3/38 |
| 12,580,688 | B1 * | 3/2026 | Myers | H04L 1/1678 |
| 2016/0254830 | A1 * | 9/2016 | Corbalis | H04B 1/123 455/307 |
| 2017/0026205 | A1 * | 1/2017 | Agee | H04W 52/52 |
| 2017/0180026 | A1 * | 6/2017 | Flynn | H04B 7/0617 |
| 2018/0331746 | A1 * | 11/2018 | Okuyama | H04B 7/0645 |
| 2019/0253112 | A1 * | 8/2019 | Raghavan | H04B 7/063 |
| 2023/0084904 | A1 * | 3/2023 | Montalvo | H04W 16/10 370/329 |
| 2023/0124883 | A1 * | 4/2023 | Montalvo | H04W 16/10 |
| 2024/0334092 | A1 * | 10/2024 | Jones | H04L 67/12 |

OTHER PUBLICATIONS

"Digital Signal Processing Tricks—Frequency Translation without multiplication", embedded, Sep. 24, 2007, 13 pgs. Retrieved from the Internet: URL: https://www.embedded.com/digital-signal-processing-tricks-frequency-translation-without-multiplication.

"Optimal Beamforming", University of Toronto, 21 pages. Retrieved from the Internet: URL: https://www.comm.utoronto.ca/~rsadve/Notes/BeamForming.pdf.

"Polyphase Channelizer", GNU Radio, Wiki, 2 pages. Retrieved from the Internet: URL: https://wiki.gnuradio.org/index.php/Polyphase_Channelizer.

"A Beginner's Guide to Digital Signal Processing (DSP)", Analog Devices, 3 pgs. Retrieved from the Internet: URL: https://www.analog.com/en/lp/001/beginners-guide-to-dsp.html.

"Delay-and-Sum Beamforming", gfai tech, 2 pgs. Retrieved from the Internet: URL:https://www.gfaitech.com/knowledge/faq/delay-and-sum-beamforming-in-the-frequency-domain.

"Half Band Filter Design: Exceptional Filtering Efficiency!", Wave Walker DSP, DSP Algorithms for RF Systems, Sep. 27, 2021, 9 pgs. Retrieved from the Internet: URL: https://www.wavewalkerdsp.com/2021/09/27/half-band-filter-design-exceptional-filtering-efficiency/.

"Phase Shifter", Geeks for Geeks, Apr. 19, 2024, 18 pgs. Retrieved from the Internet: URL: https://www.geeksforgeeks.org/phase-shifter/.

Chaudhari, Qasim, "Spectral Shift without any Multiplications", Wireless Pi, 14 pgs. Retrieved from the Internet: URL: https://wirelesspi.com/spectral-shift-without-any-multiplications/.

Elbir, et al., "Twenty-Five Years of Advances in Beamforming: From Convex and Nonconvex Optimization to Learning Techniques", IEEE Signal Processing Magazine Special Issue on the 75th Anniversary of IEEE Signal Processing Society, Mar. 22, 2023, 13 pgs. Retrieved from the Internet: URL: https://arxiv.org/pdf/2211.02165.

Hahn, James, "Introduction to Digital Signal Processing", Jan. 27, 2011, 90 pgs. Retrieved from the Internet: URL: https://classes.engineering.wustl.edu/ese497/images/0/05/DSP_ESE497.

Hamdy, Mohamed Nadder, "Beamformers explained", Commscope, 28 pgs. Retrieved from the Internet: URL: https://www.commscope.com/globalassets/digizuite/542044-Beamformer-Explained-WP-114491-EN.pdf.

Harris, et al., "Cascade Non-Maximally Decimated Filter Banks Form Efficient Variable Bandwidth Filters for Wideband Digital Transceivers", Amazon aws, 6 pgs. Retrieved from the Internet: URL: https://s3.amazonaws.com/embeddedrelated/user/124841/dsp_2017_3_47699.pdf.

Harris, et al., "Filter banks for software defined radio", Amazon aws, 27 pgs. Retrieved from the Internet: URL: https://s3.amazonaws.com/embeddedrelated/user/124841/fbmc_book_ch_6_text_5_61615.pdf.

Haynes, Toby, "A Primer on Digital Beamforming", Spectrum Signal Processing, Mar. 26, 1998, 15 pgs. Retrieved from the Internet: URL: http://archive.eclass.uth.gr/eclass/modules/document/file.php/MHX214/Additional%20Material/%21%20A%20Primer%20on%20Digital%20Beamforming.pdf.

Kaufman, David, "Application of Kuiper Systems LLC for Authority to Launch and Operate a Non-Geostationary Satellite Orbit System in V-band and Ku-band Frequencies", Technical Appendix, Nov. 4, 2021, 36 pgs. Retrieved from the Internet: URL: https://fcc.report/IBFS/SAT-LOA-20211104-00145/13337528.pdf.

Kwon, et al., "Satellite Digital Channelizer Beamforming With Predistorted High-Power Amplifier", Wichita State University, Department of Electrical Engineering and Computer Science, Nov. 10, 2019, 62 pgs. Retrieved from the Internet: URL: https://apps.dtic.mil/sti/pdfs/AD1090326.pdf.

Langlois, Luc, "Beamforming: Fundementals to Implementation", Avnet, 2021, 24 pgs. Retrieved from the Internet: URL: https://www.avnet.com/wps/wcm/connect/onesite/74e47590-0644-471a-987c-51520c347279/SPMT-RFSoC-white-paper-6.pdf?MOD=AJPERES&CVID=nQaWL9R&CVID=nQaWL9R&CVID=nQ1g63w&CVID=nQ1g63w&CVID=nQ1g63w&CVID=nQ1g63w&CVID=nQ1g63w&CVID=nQ1g63w&CVID=nQ1g63w&CVID=nQ1g63w&attachment=false&id=163640357104.

Navarro, Alvaro Palomo, "Channelization for Multi-Standard Software-Defined Radio Base Stations", Department of Electronic Engineering, National University of Ireland Maynooth, Oct. 2011, 277 pgs. Retrieved from the Internet: URL: https://mural.maynoothuniversity.ie/3722/1/Channlization_for_Multistandard_SDR_Base_Stations-Alvaro_Palomo_PhD.pdf.

Pucker, Lee, "Channelization Techniques for Software Defined Radio", Proceeding of the SDR 03 Technical Conference and Product Exposition, 2003, 6 pgs. Retrieved from the Internet: URL: https://www.wirelessinnovation.org/assets/Proceedings/2003/2003-hw2-002-pucker.pdf.

Robertson, Neil, "Phase or Frequency Shifter Using a Hilbert Transformer", DSP Related, Mar. 25, 2018, 18 pgs. Retrieved from the Internet: URL: https://www.dsprelated.com/showarticle/1147.php.

Stoica, et al., "Robust Capon Beamforming", IEEE Signal Processing, vol. 10, No. 6, , Jun. 6, 2003, 4 pgs. Retrieved from the Internet: URL: http://www.sal.ufl.edu/eel6537/2006/rcb2.pdf.

Tan, et al., "Polyphase Filter", Science Direct, Engineering, 2019, 9 pgs. Retrieved from the Internet: URL: https://www.sciencedirect.com/topics/engineering/polyphase-filter.

* cited by examiner

SYSTEM FOR TIME DOMAIN RECEIVE CHANNELIZATION

BACKGROUND

An analog signal or set of analog signals may be represented as a set of samples. The set of analog signals may contain analog signals associated with different frequency ranges or channels. Channelization provides samples that are associated with a specified channel.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
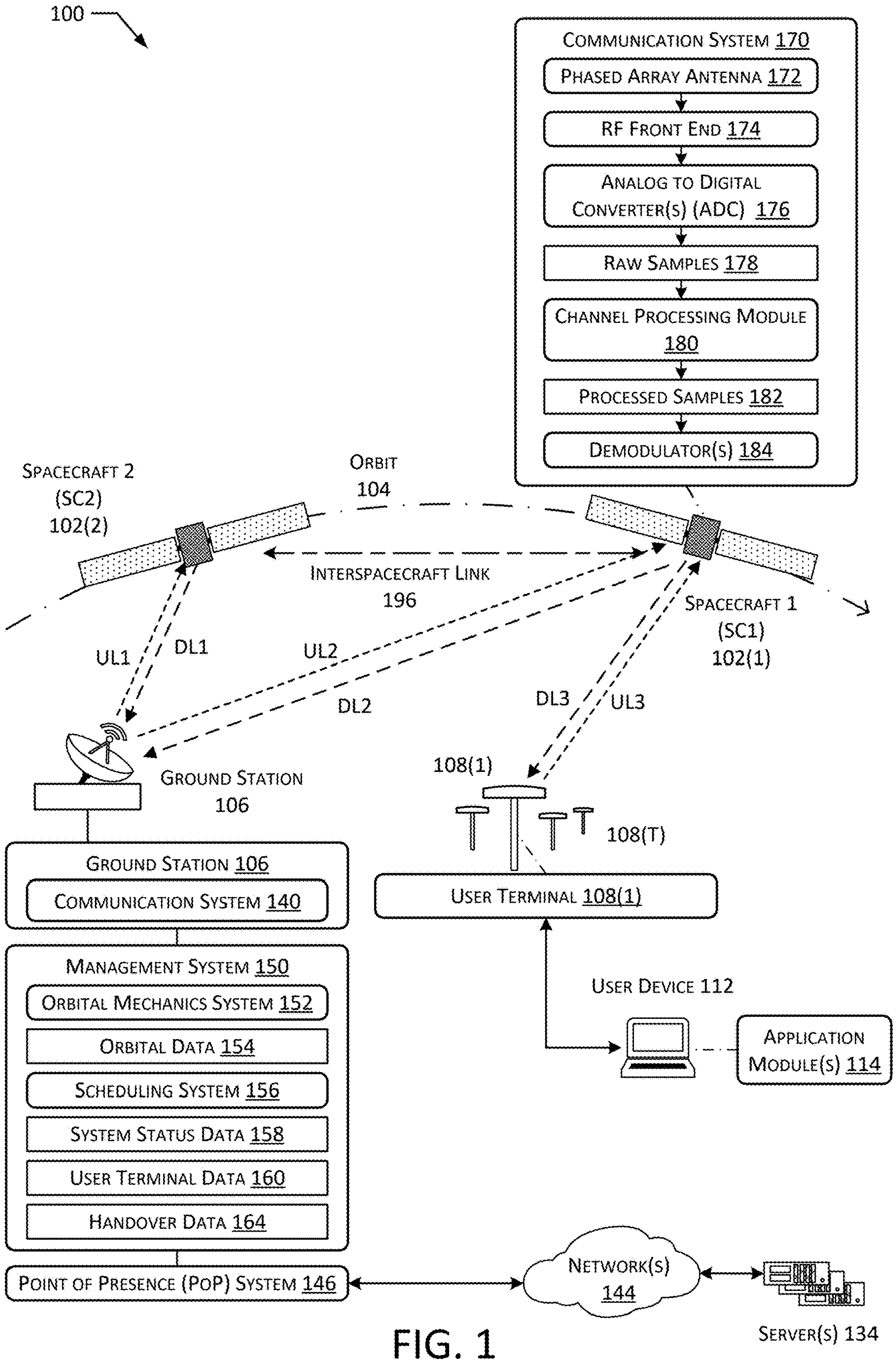
FIG. 1 illustrates a spacecraft communication system utilizing a channel processing module performing time domain receive channelization onboard a spacecraft, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize spacecraft to wirelessly transfer data between user terminals and ground stations that in turn connect to other networks, such as the Internet. The spacecraft provide communication services between ground stations and devices, such as user terminals (UT) located on or near a body such as the Earth. For example, a first UT at a first geographic location (geolocation) on the Earth may send upstream data to a first spacecraft that is in range of the first UT. The first spacecraft may send the upstream data to a gateway, another spacecraft, and so forth. For example, the first spacecraft may send the upstream data to a gateway that in turn sends the upstream data to a point-of-presence (POP). The POP may then send the upstream data to a device on another network, such as a server on the Internet.

Likewise, downstream data destined for the first UT may be received at the PoP. The POP sends the downstream data to the gateway that in turn uses a ground station uplink to send the downstream data to the first spacecraft. The first spacecraft then sends the downstream data to the first UT.

For ease of illustration, and not necessarily as a limitation, a spacecraft may be deemed "in range" of a station such as a gateway or UT when communication may take place with that station. For example, a spacecraft may be in range when it is within line of sight of the gateway, a distance between the spacecraft and the gateway is less than a threshold distance, the gateway is within a footprint of an antenna onboard the spacecraft, and so forth. One of the factors that determines how long a spacecraft is within range of the station is an orbital period of the spacecraft, that is determined by the altitude of the spacecraft.

The period, or duration, of an orbit varies depending upon the altitude of the spacecraft with respect to the body, eccentricity of the orbit, and so forth. For example, a spacecraft at an altitude of 600 kilometers (km) will take approximately 96 minutes to complete a circular orbit around the Earth. Depending on a variety of factors including the curvature of the Earth, a spacecraft may be in range of a particular station for only a few minutes. This results in a station being frequently handed off from one spacecraft to another to maintain continuous communication services. In comparison, a geosynchronous spacecraft has an orbital period that coincides with the rotation of the Earth, so a geosynchronous spacecraft appears to remain motionless with respect to the Earth. While the apparent motionlessness with respect to the station removes the need for handoffs, other drawbacks associated with the geosynchronous spacecraft remain.

Signals between the station and the spacecraft are limited to travelling at the speed of light. The farther away a spacecraft is from the station, the longer it takes for a signal to travel to the spacecraft and then travel back to Earth. For example, a hop (sending a signal to the spacecraft and back down to the ground, or vice versa) to a geosynchronous spacecraft introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) spacecraft at an altitude of 600 km only introduces about 4 ms of latency comprising 2 ms up to the spacecraft and 2 ms down to the station. However, the latency does vary as distance to the NGO spacecraft changes. As a result, compared to using geosynchronous spacecraft, the use of NGO spacecraft significantly reduces latencies due to signal travel times.

Due to the constant relative motion of the spacecraft relative to the stations on or near the Earth, the signals between the spacecraft and the station experience changes in frequency due to the Doppler effect. For example, as the spacecraft moves towards the station, the frequency of a signal received at the spacecraft appears (to the receiver onboard the spacecraft) to have been shifted to a higher frequency. Similarly, as the spacecraft moves away from the station, the frequency of a signal received at the spacecraft appears (to the receiver onboard the spacecraft) to have been shifted to a lower frequency. To maintain communication, these Doppler effects may be taken into consideration and received signals may be adjusted accordingly.

Using a constellation of many NGO spacecraft offers significant benefits compared to a geosynchronous spacecraft. Latency is dramatically reduced, improving usefulness for communication. Shorter distances between the station and the spacecraft allow for increased station density by allowing greater frequency re-use and sharing. Power and antenna gain requirements for both the station and the spacecraft are also reduced due to the shorter distances, compared to communication using geosynchronous spacecraft. This allows for relatively smaller and less expensive spacecraft to be used.

The NGO spacecraft may utilize phased array antennas (PAA) to receive, transmit, or receive and transmit signals. The signals used by the constellation have several characteristics. An analog signal may have a carrier frequency, such as 23 gigahertz (GHz). An analog signal has a bandwidth, indicating a range of frequences that the analog signal may be confined to. For example, an analog signal may have a bandwidth of 25 megahertz (MHz). For various reasons, such as licensing requirements or to improve performance, a portion of radio frequency spectrum that is used by the constellation may be divided into channels. Each channel designates a specified frequency range. During operation, analog signals may be generated and received that have bandwidths that are within a particular channel, or within two or more adjacent channels. For example, the constellation may be licensed by a regulatory authority to send signals from a UT to a spacecraft within 400 MHz of radio spectrum in a 28 GHz band. This may comprise 16 narrow channels of 25 MHz bandwidth each, 8 wide channels of 50 MHz bandwidth each, or some combination thereof.

The PAA comprises many smaller antennas. Analog radio frequency signals acquired from each of these smaller antennas are provided to radio receivers where they are converted to digital samples. These "raw" digital samples (samples) may represent measured amplitudes of analog signals at various frequencies over time. If the samples are acquired at a sufficiently fast sample rate, such as twice the bandwidth of the analog signal, the samples may provide a highly accurate representation of the analog signals.

Once acquired, the raw samples may be processed in different ways. For example, beamforming algorithms may apply changes to the values of the samples to introduce phase, amplitude, or other changes to samples to produce beamforming effects at specified frequencies. A beamforming effect allows the PAA to be electronically "steered", producing gain in various directions with respect to the PAA without physically moving the PAA. For example, the beamforming effect may be used to produce a "beam". Signals received from within the beam will exhibit a greater amplitude than signals outside of the beam. Beamforming may be used to preferentially receive signals from particular locations. By processing the raw samples, one or more beams may be manifested, up to the limit of the hardware to perform the necessary calculations. This provides great flexibility during operation.

During operation of a system such as the constellation, it becomes apparent that the scale of data being processed rapidly becomes enormous while processing the raw samples from a single PAA. Consider the use of the 400 MHz bandwidth. This would produce 800 million samples per second (megasamples per second or Msps). To avoid latency issues or loss of information, these raw samples must be timely processed. As mentioned above, such processing may include application of beamforming algorithms to produce desired beam characteristics. This is a substantial computing task, requiring memory and processing units. The addition of other processing operations further increases the computing requirements.

Traditionally the processing of many samples per second has involved numerous design tradeoffs, including using a "pipeline" or sequence of hardware and software to sequentially process data in an effort to minimize the overall quantity of samples being processed and the complexity of those operations being performed. However, such techniques introduce substantial constraints on the flexibility of the system. Such constraints become particularly challenging in situations in which it is infeasible to make future changes to hardware. For example, in a terrestrial communication system it may be reasonable to expect that in a few years a technician may visit a site and upgrade communication hardware. However, this is infeasible for a constellation of spacecraft in orbit.

As a result, traditional systems are limited in their initial performance and subsequent capability to be updated. For example, a system may be designed to operate with a first analog waveform having a bandwidth of 50 MHz but may be unable to operate using a second analog waveform having a bandwidth of 25 MHz, or vice versa.

Described in this disclosure are systems and techniques to process raw samples such as generated by a PAA and provide output data that is suitable for demodulation. A channel processing module (CPM) accepts digital raw samples of analog signals acquired by a phased array antenna. These analog signals may include one or more different waveforms that utilize different bandwidths.

An oversampling channelizer oversamples by two times the raw samples and provides channel samples for each channel of a plurality of samples. Each stream of samples may represent a channel that has the same bandwidth. A single channel may be used as a narrow channel, while two or more adjacent channels may be combined and used as a wide channel. In some implementations non-adjacent channels may be combined and used as a wide channel. The raw samples produced by the oversampling channelizer may also be aligned to specified channel frequency ranges, compensating for frequency shifting effects such as the Doppler effect.

Two streams of channel samples may be processed by a wide channel module using respective frequency translators. A first frequency translator translates the frequency of the input samples down to create samples associated with a lower frequency, while a second frequency translator translates the frequency of its input samples up to create samples associated with a higher frequency. The resulting frequency translated samples are added to provide reconstructed samples that represent a wide channel waveform. The use of the frequency translators and the addition provides a computationally efficient and low latency way to generate a perfect reconstruction of an analog signal that spans two channels. The reconstructed samples may be processed by a beamformer algorithm to determine wide channel reconstructed samples. In other implementations, at least some operations may be performed after operation of the beamformer algorithms. The wide channel reconstructed samples may then be sent to a demodulator that recovers the data represented in the reconstructed samples.

One stream of channel samples may be processed by a narrow channel module that includes a decimator that downsamples by two times the channel samples and provides downsampled samples. The downsampled samples may be processed by a beamformer algorithm to provide narrow channel beamformed samples representative of a narrow channel waveform. The narrow channel beamformed samples may then be sent to a demodulator that recovers the data represented in those samples.

The oversampling channelizer is computationally efficient and is able to operate on the incoming raw samples without introducing a substantive latency or loss of data. The resulting channels of oversampled data may be readily used to provide effective channels that are integer multiples of the channels produced by the oversampling channelizer. For example, a "narrow" channel may be used that comprises samples from a single channel, or a "wide" channel may be used that comprises samples from two channels.

Given the computational efficiency and flexibility, these techniques may be implemented within a digital signal processor (DSP). For example, one or more of the oversampling channelizer, one or more narrow channel modules, one or more wide channel modules, and a beamforming module performing beamformer algorithm operations may be executed on a single DSP, or by a series of DSPs.

By using these techniques and systems, a communication system may be deployed that is able to simultaneously support multiple waveforms with different bandwidths and facilitate future changes to those waveforms. This improves overall flexibility of the system to operate in different regulatory and technical modes over extended periods of time.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

As height above ground increases, the area on the ground that is visible from that elevated point increases. For example, the higher you go in a building or on a mountain, the farther you can see. The same is true for the electromagnetic signals used to provide communication services. A communication relay having a radio receiver and transmitter with its antennas placed high above the ground is able to "see" more ground and provide communication service to a larger area. A communication relay placed on a spacecraft high in space is able to provide communication services to many users across a large geographic area.

A spacecraft may be maintained in space for months or years by placing it into orbit around the Earth. Once placed, further physical maintenance such as performing an equipment changeout on the spacecraft may be infeasible. The movement of the spacecraft in orbit is directly related to the height above ground. For example, the greater the altitude the longer the period of time it takes for a spacecraft to complete a single orbit. A spacecraft in a geosynchronous orbit at an altitude of 35,800 km may appear to be fixed with respect to the ground because the period of the geosynchronous orbit matches the rotation of the Earth. In comparison, a spacecraft in a non-geosynchronous orbit (NGO) will appear to constantly move with respect to the Earth. For example, a spacecraft in a circular orbit at 600 km will circle the Earth about every 96 minutes.

Spacecraft in NGOs may be used to alleviate various drawbacks associated with spacecraft in geosynchronous orbit. The altitude of an NGO is high enough to provide coverage to a large portion of the ground, while remaining low enough to minimize latency due to signal propagation time. For example, the lower altitude of the spacecraft in NGO, compared to a geosynchronous orbit, provides coverage over a much smaller portion of the Earth. The lower altitude also reduces the distance the electromagnetic signal has to travel. For example, the spacecraft at 600 km only introduces 4 ms of latency for a single hop. Compared to the geosynchronous orbit, the reduced distance of the NGO reduces the dispersion of electromagnetic signals. This allows the spacecraft in NGO as well as the device communicating with the spacecraft to use a less powerful transmitter, use smaller antennas, and so forth.

The system 100 shown here comprises a plurality (or "constellation") of spacecraft 102(1), 102(2), . . . , 102(S), each spacecraft 102 being in orbit 104. Also shown is a ground station 106, user terminals (UTs) 108, and user devices 112. Each user device 112 may execute one or more application modules 114. For example, the application modules 114 may comprise email applications, telephony applications, videoconferencing applications, telemetry applications, web browser applications, and so forth.

The constellation may comprise hundreds or thousands of spacecraft 102, in various orbits 104. For example, one or more of these spacecraft 102 may be in non-geosynchronous orbits (NGOs) in which they are in constant motion with respect to the Earth, such as a low earth orbit (LEO). In this illustration, orbit 104 is depicted with an arc pointed to the right. A first spacecraft (SC1) 102(1) is leading (ahead of) a second spacecraft (SC2) 102(2) in the orbit 104. The spacecraft 102 is discussed in more detail with regard to FIG. 2.

With regard to FIG. 1, an uplink is a communication link which allows data to be sent from a ground station 106 to a spacecraft 102, from a UT 108 to the spacecraft 102, or from another device to the spacecraft 102. Uplinks are designated as UL1, UL2, UL3 and so forth. For example, UL1 is a first uplink from the ground station 106 to the second spacecraft 102(2). In comparison, a downlink is a communication link which allows data to be sent from the spacecraft 102 to a ground station 106, UT 108, or device other than another spacecraft 102. For example, DL1 is a first downlink from the second spacecraft 102(2) to the ground station 106. The spacecraft 102 may also be in communication with one another. For example, an interspacecraft link (ISL) 196 provides for communication between spacecraft 102 in the constellation.

One or more ground stations 106 are in communication with one or more spacecraft 102. The ground stations 106 may pass data between the spacecraft 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more spacecraft 102, other ground stations 106, and so forth. The ground station 106 may also be connected to one or more communication networks 144. For example, the ground station 106 may connect to a terrestrial fiber optic communication network 144.

The ground station 106 may act as a network gateway, passing data between the one or more communication networks 144 and the spacecraft 102. Such data may be processed by the ground station 106 and communicated via the communication system 140. The communication system 140 of a ground station 106 may include components similar to those of a communication system 170 of a spacecraft 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth. In some implementations the communication system 140 may include one or more channel processing modules 180.

In some implementations, the ground station uplink to the spacecraft 102 may utilize various techniques such as transmitting different signals using the same frequency and different polarizations, transmitting several signals on different frequencies, and so forth. These techniques may be used to increase the amount of data that may be transmitted from the ground station 106 to the spacecraft 102 per unit of time.

Onboard the spacecraft 102, corresponding hardware allows for the reception and demodulation of the data sent from another station such as a ground station 106 or a UT 108 on an uplink. The spacecraft 102 includes a communication system 170. The communication system includes one or more antennas. For example, each spacecraft 102 may have two gateway antennas, each comprising a parabolic antenna. These gateway antennas may be connected to one or more radio-frequency (RF) front ends and provide communication with the ground stations 106. The spacecraft 102 may have one or more phased array antennas (PAAs) 172. These PAAs 172 may be connected to one or more RF front ends 174 and provide communication with the UTs 108. The RF front ends 174 may comprise software defined radios (SDRs), direct sampling receivers, and so forth. The RF front ends 174 may include, or may send analog signals to, one or more analog-to-digital converters (ADCs) 176. The ADCs 176 provide as output raw samples 178. In some implementations, the RF front ends 174 may include ADCs 176, such as in the case of direct sampling receivers. The raw samples 178 may represent measured amplitudes of analog signals at various frequencies over time. ADCs 176 may utilize a sampling rate that is twice the bandwidth of the analog signal. For example, if the bandwidth of the analog signal is 25 MHz, the sampling rate may be 50 megasamples per second (Msps). In other implementations, other sampling rates may be used.

The raw samples 178 are processed by a channel processing module (CPM) 180 to produce processed samples 182. For example, the processed samples 182 may comprise samples associated with a particular wide or narrow channel that have had a beamforming algorithm or other processing applied. The processed samples 182 are sent to one or more demodulators 184 that demodulate the processed samples 182 to recover data that was transmitted. This data may then be subsequently processed, such as routed and retransmitted to another UT 108 or ground station 106.

Operation of the channel processing module 180 is discussed in more detail with regard to FIGS. 4-7.

The ground stations 106 are in communication with a management system 150. The management system 150 is also in communication, via the ground stations 106, with the spacecraft 102 and the UTs 108. The management system 150 coordinates operation of the spacecraft 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular spacecraft 102 at a specified time. In one implementation, the orbital mechanics system 152 may use orbital elements that represent characteristics of the orbit 104 of the spacecraft 102 in the constellation to determine the orbital data 154 that predicts location, velocity, and so forth of particular spacecraft 102 at particular times or time intervals. For example, the orbital mechanics system 152 may use data obtained from actual observations from tracking stations, data from the spacecraft 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first spacecraft 102(1) to the second spacecraft 102(2). Continuing the example, the scheduling system 156 may also specify communication parameters such as frequency, wide or narrow channels allocated, timeslot indicative of when transmission is permitted, and so forth. These communication parameters may be associated with operation of a ground station uplink to the spacecraft 102, downlink from the spacecraft 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, spacecraft availability, current spacecraft 102 in use by respective UTs 108, capacity available at particular ground stations 106, and so forth. For example, the spacecraft availability may comprise information indicative of spacecraft 102 that are available to provide communication service or those spacecraft 102 that are unavailable for communication service. Continuing the example, a spacecraft 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a spacecraft 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next spacecraft identifier (ID) that is indicative of the next spacecraft 102 that will be providing communication service to the specified UT 108, channel allocations, and so forth. The handover data 164 facilitates an orderly transition of the UT 108 from a first spacecraft 102(1) to a second spacecraft 102(2).

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

The UT 108 includes a communication system, such as a spacecraft network interface, to establish communication with one or more spacecraft 102. The communication system of the UT 108 may include components similar to those of the communication system 170 of a spacecraft 102 and may perform similar communication functionalities. For example, the communication system may include one or more modems, digital signal processors, power amplifiers, antennas (including at least one antenna that implements multiple antenna elements, such as a phased array antenna), channel processing module(s), processors, memories, storage devices, communications peripherals, interface buses, and so forth.

The UT 108 passes data between the constellation of spacecraft 102 and the user device 112. The UT 108 may connect to the user device 112 using a second network interface. For example, the second network interface may comprise a wireless local area network, wired local area network, terrestrial wide area network, and so forth. The user device 112 may execute one or more application modules 114. The data includes upstream data sent by the user device 112 or downstream data that is addressed to the UT 108 or the user device 112. For example, during operation the application module 114 may send upstream data and receive downstream data. The upstream data and the downstream data each may comprise header data and payload data. The UT 108 may be fixed or in motion. For example, the UT 108 may be used at a residence, business, or on a vehicle such as a car, boat, aerostat, drone, airplane, and so forth.

The system 100 may include one or more POP systems 146. Each POP system 146 may comprise one or more servers or other computing devices. Separate POP systems 146 may be located at different locations. In one implementation, a POP system 146 may be associated with providing service to a plurality of UTs 108 that are located in a particular geographic region.

The POP systems 146 may manage communication between the system 100 and the network 144. For example, a first POP system 146 may receive the upstream data and send that upstream data to the network 144. In another example, the first POP system 146 may receive the downstream data and proceed to attempt delivery of the downstream data to the UT 108.

The POP system 146 is in communication with one or more ground stations 106(1), 106(2), . . . , 106(G) and the management system 150. In some implementations one or more functions may be combined. For example, the POP system 146 may perform one or more functions of the management system 150. In another example, the POP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 112.

The spacecraft 102, the ground station 106, the user terminal 108, the user device 112, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
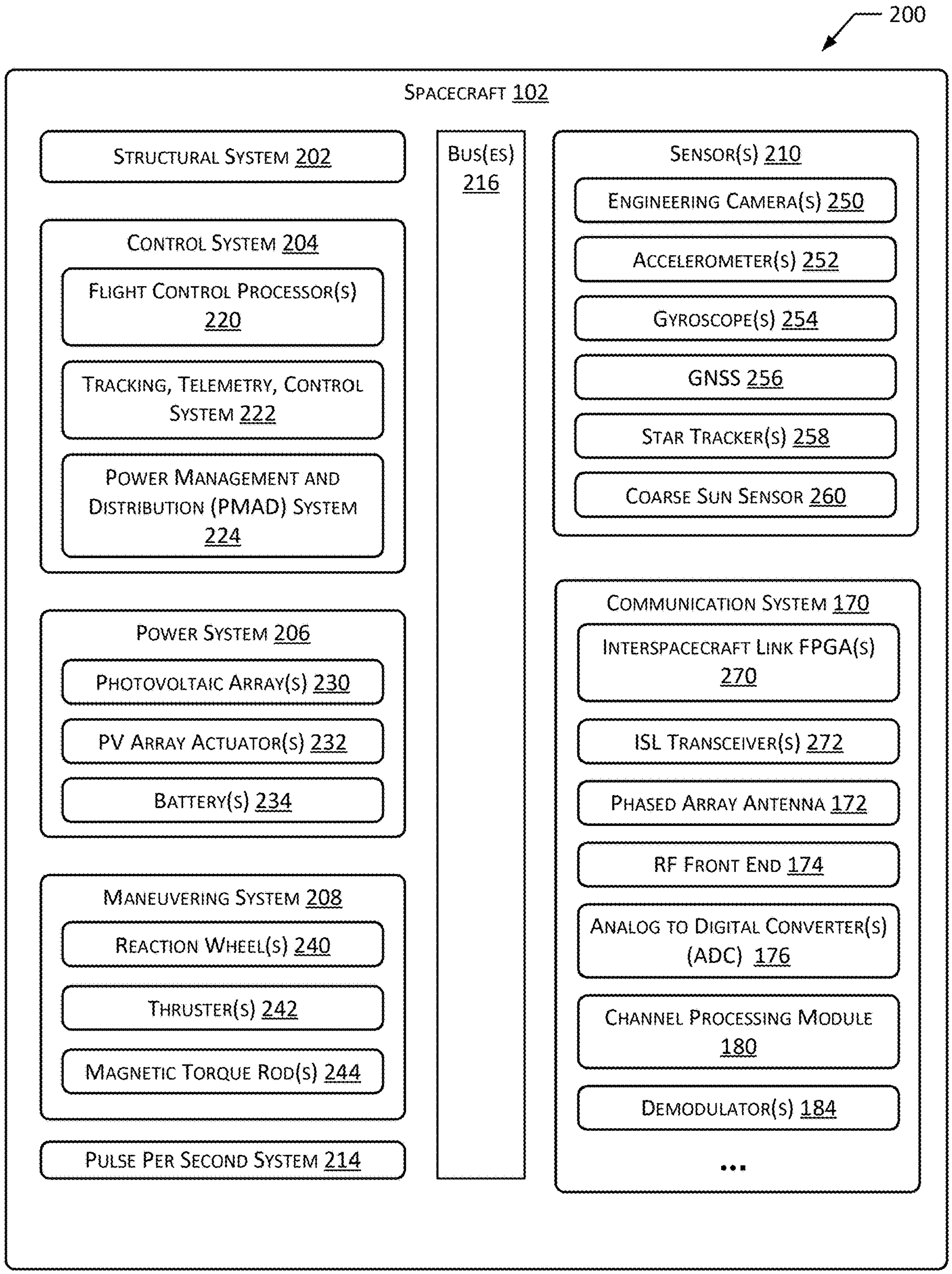
FIG. 2 is a block diagram of some systems associated with the spacecraft, according to some implementations.

FIG. 2 is a block diagram 200 of some systems associated with the spacecraft 102, according to some implementations. The spacecraft 102 may comprise a structural system 202, a control system 204, a power system 206, a maneuvering system 208, one or more sensors 210, and a communication system 170. A pulse per second (PPS) system 214 may be used to provide timing reference to the systems onboard the spacecraft 102. One or more buses 216 may be used to transfer data between the systems onboard the spacecraft 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus 216 may comprise coaxial cable, waveguides, and so forth to transfer radio signals from one part of the spacecraft 102 to another. In other implementations, some systems may be omitted or other systems added. One or more of these systems may be communicatively coupled with one another in various combinations.

The structural system 202 comprises one or more structural elements to support operation of the spacecraft 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the spacecraft 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 170. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the spacecraft 102, control battery 234 charging, and so forth.

The power system 206 provides electrical power for operation of the components onboard the spacecraft 102. The power system 206 may include components to generate electrical energy. For example, the power system 206 may comprise one or more photovoltaic (PV) arrays 230 comprising a plurality of photovoltaic cells, thermoelectric devices, fuel cells, and so forth. One or more PV array actuators 232 may be used to change the orientation of the photovoltaic array(s) 230 relative to the spacecraft 102. For example, the PV array actuator 232 may comprise a motor. The power system 206 may include components to store electrical energy. For example, the power system 206 may comprise one or more batteries 234, fuel cells, and so forth.

The maneuvering system 208 maintains the spacecraft 102 in one or more of a specified orientation or orbit 104. For example, the maneuvering system 208 may stabilize the spacecraft 102 with respect to one or more axes. In another example, the maneuvering system 208 may move the spacecraft 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The spacecraft 102 includes one or more sensors 210. The sensors 210 may include one or more engineering cameras 250. For example, an engineering camera 250 may be mounted on the spacecraft 102 to provide images of at least a portion of the photovoltaic array 230. Accelerometers 252 provide information about acceleration of the spacecraft 102 along one or more axes. Gyroscopes 254 provide information about rotation of the spacecraft 102 with respect to one or more axes. The sensors 210 may include a global navigation spacecraft system (GNSS) 256 receiver, such as a Global Positioning System (GPS) receiver, to provide information about the position of the spacecraft 102 relative to Earth. In some implementations the GNSS 256 may also provide information indicative of velocity, orientation, and so forth. One or more star trackers 258 may be used to determine an orientation of the spacecraft 102. A coarse sun sensor 260 may be used to detect the sun, provide information on the relative position of the sun with respect to the spacecraft 102, and so forth. The spacecraft 102 may include other sensors 210 as well. For example, the spacecraft 102 may include a horizon detector, radar, lidar, and so forth.

The communication system 170 provides communication with one or more other devices, such as other spacecraft 102, ground stations 106, user terminals 108, and so forth. The communication system 170 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other spacecraft 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, demodulating, decoding, decompressing, error correction, and formatting. Data decoded by the communication system 170 may be output to other systems. Output from a system, such as the control system 204, may be provided to the communication system 170 for transmission.

The communication system 170 may include hardware to support the interspacecraft link 196. For example, an interspacecraft link FPGA 270 may be used to modulate data that is sent and received by an ISL transceiver 272 to send data between spacecraft 102. The ISL transceiver 272 may operate using radio frequencies, optical frequencies, and so forth.

The spacecraft 102 may maintain a ground station uplink using one or more of the antennas, RF front end(s), modems, and so forth. The spacecraft 102 may include one or more antennas. For example, one or more parabolic antennas may be used to provide communication between the spacecraft 102 and one or more ground stations 106. In another example, a phased array antenna (PAA) 172 may be used to provide communication between the spacecraft 102 and the UTs 108.

The RF front ends 174 may comprise software defined radios (SDRs), direct sampling receivers, and so forth. The RF front ends 174 may include, or may send data to, one or more analog-to-digital converters (ADCs) 176. The ADCs 176 provide as output raw samples 178.

The communication system 170 includes one or more channel processing modules 180. The channel processing module (CPM) 180 may comprise instructions executing on a processor, dedicated hardware, or a combination thereof. In some implementations the CPM 180 may be implemented as one or more digital signal processors (DSP) that process the raw samples 178 to generate the processed samples 182 that are sent to the demodulators 184. The DSP may be designed to minimize power consumption while performing the specified processing operations.

The communication system 170 may include one or more modems that include one or more demodulators 184. The modems or demodulators 184 may comprise one or more of DSPs, FPGAs, ASICs, and so forth that operate to demodulate a signal and produce demodulated data as output.

The communication system 170 may comprise other modems. For example, one or more modems may be used to generate signals based on input data to send data on a downlink from the spacecraft 102 to the ground station 106 or the UT 108.

Figure 3:
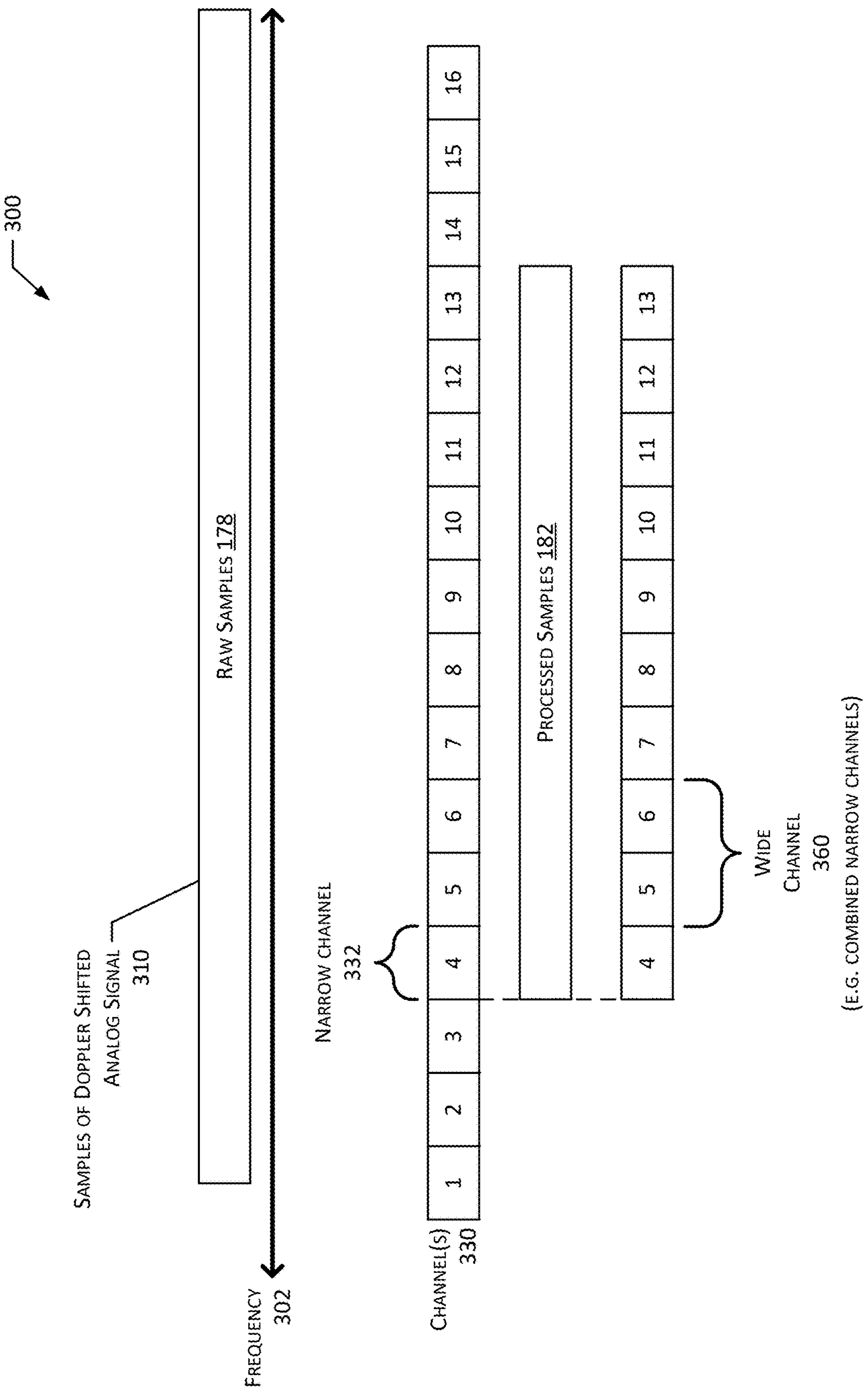
FIG. 3 illustrates raw samples of analog signals that have been frequency translated and their alignment to specified channel frequencies, according to some implementations.

FIG. 3 illustrates at 300 raw samples of analog signals that have been frequency translated and their alignment to specified channel frequencies, according to some implementations. In this illustration frequency 302 is depicted along a horizontal axis.

The raw samples 178 in this example represent one or more analog signals that have been frequency translated upwards. For example, in this example the communication system 170 onboard the spacecraft 102 may have acquired the signals that are represented by the raw samples 178 as the spacecraft 102 was moving towards the UT 108, resulting in a Doppler shifted increase in apparent frequency of the signals at the spacecraft 102. In this illustration, the raw samples 178 are oversampled from the analog input.

Also depicted are a plurality of channels 330. Each channel 330 is associated with a specified frequency range. In this illustration the channels 330 have the same channel frequency width, such as each channel 330 having a frequency width of 25 MHz.

For ease of discussion, and not necessarily as a limitation, channels 330 may be described as narrow channels 332 or wide channels 360. A narrow channel 332 has a channel frequency width that is less than that of a wide channel 360. In the implementation shown, wide channels 360 are integer multiples of narrow channels 332. For example, a wide channel 360 may comprise channels 330(5) and 330(6). In some implementations a wide channel 360 may comprise a plurality of adjacent narrow channels 332. In some implementations, the signal bandwidth of a narrow channel 332 may be at most one-half of the signal bandwidth of a wide channel 360. In other implementations, a wide channel 360 may comprise a plurality of non-adjacent narrow channels 332.

In this illustration, the processed samples 182 have had their respective frequencies adjusted to compensate for Doppler effects. For example, the processed samples 182 are now aligned such that the samples are now representative of signals associated with respective channels 330. In some implementations, individual channels 330 may not be used for data transfer. For example, channels at the lower and upper bounds may be set aside as guard channels to allow for frequency changes due to Doppler effects, to accommodate processing and filtering, and so forth. Continuing the example, channels 330(1)-(3) and 330(14)-(16) in this figure may be used as guard channels and not be used for data transfer.

With regard to FIGS. 4-7, in some implementations the channel processing module 180 may be implemented as instructions executing on one or more digital signal processors (DSPs) or other processors. While some elements of the CPM 180 are described with regard to analog functions, it is understood that these operations may be performed digitally. For example, the mixers 442 may be implemented as digital operations executing on a DSP to process samples instead of as analog devices processing analog inputs.

Figure 4:
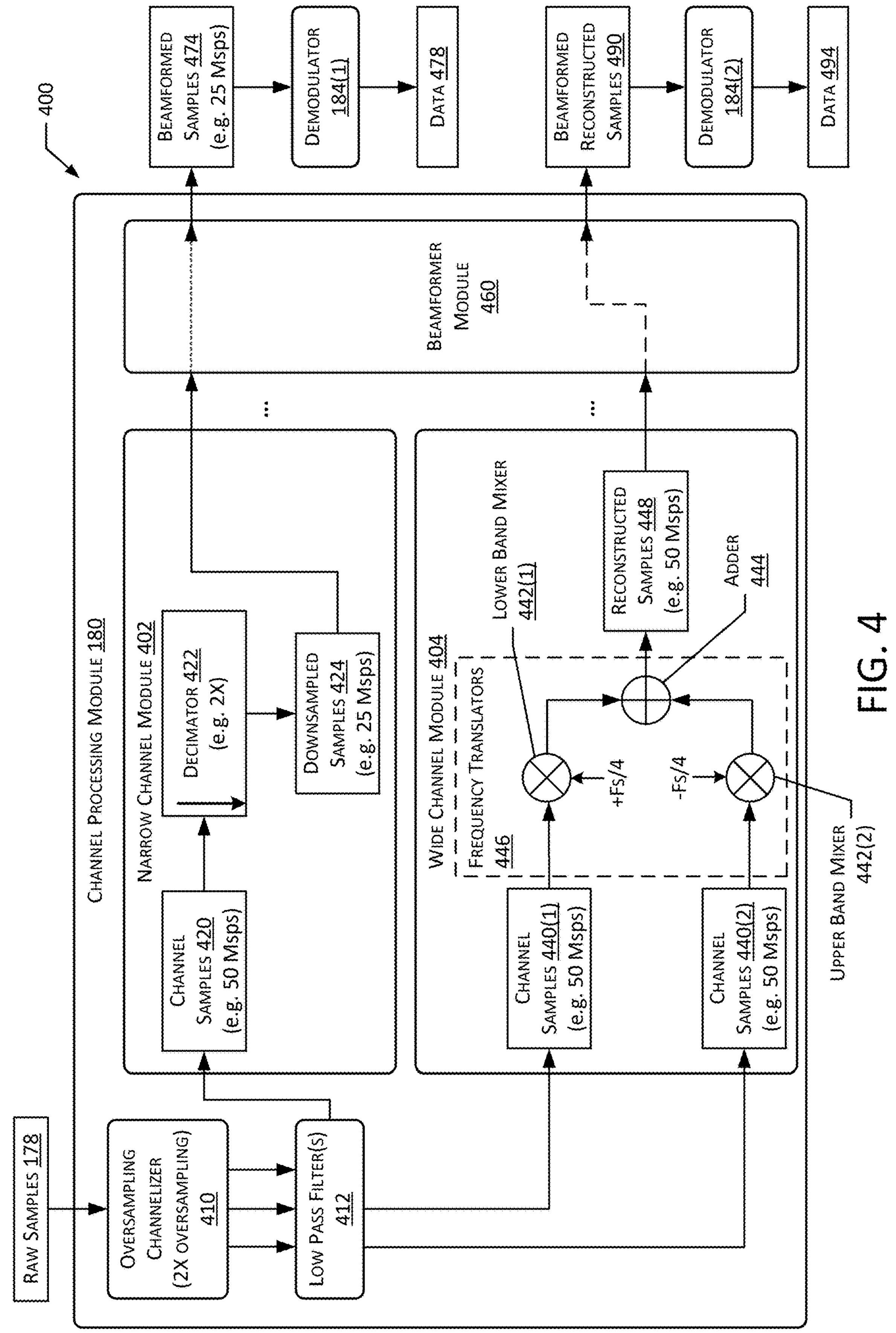
FIG. 4 illustrates a block diagram of a first architecture of a channel processing module, according to some implementations.

FIG. 4 illustrates at 400 a block diagram of a first architecture of a CPM 180, according to some implementations. The CPM 180 in this implementation comprises an oversampling channelizer 410, narrow channel module 402, wide channel module 404, and beamformer module 460.

The oversampling channelizer 410 comprises an input that receives raw samples 178 obtained from signals received by a PAA 172. For example, the raw samples 178 may be delivered at a rate of 800 Msps.

The oversampling channelizer 410 may oversample the raw samples 178 by a factor of two relative to a sampling frequency of the raw samples 178 to generate streams of channel samples. Each stream may comprise samples that are associated with a particular channel 330. In the implementation shown, the oversampling channelizer 410 may generate three streams: a first stream comprises first channel samples 420, a second stream comprises second channel samples 440(1), and a third stream comprises third channel samples 440(2). The first stream of first channel samples 420 is provided to an input of a narrow channel module 402. In some implementations, the oversampling channelizer 410 may implement a non-maximally decimated M-path polyphase analysis and synthesis channelizer. (See Harris, et al, "Filter banks for software defined radio".) In some implementations, cascaded polyphase filters with a Nyquist filter may be used, such as cascade non-maximally decimated filter banks. (See Harris, et, al, "Cascade Non-Maximally Decimated Filter Banks Form Efficient Variable Bandwidth Filters for Wideband Digital Transceivers".)

Output from the oversampling channelizer 410 may be processed by one or more low pass filters (LPFs) 412. In one implementation, the LPFs 412 may set every other sample coefficient of incoming samples to zero. For example, the value indicative of energy in every other sample may be set to zero.

The narrow channel module 402 receives at an input the first stream of first channel samples 420 after filtering and processes them with a decimator 422. The decimator 422 decimates samples received at an input by a factor of two and provides as output downsampled samples 424. For example, if the first channel samples 420 are delivered at a rate of 50 Msps, the downsampled samples 424 are output at a rate of 25 Msps. The downsampled samples 424 may be sent to an input of a beamformer module 460 that produces beamformed samples 474. The beamformed samples 474 sent by an output of the beamformer module 460 may be provided to an input of a demodulator 184(1). The demodulator 184(1) may process the beamformed samples 474 to recover the data encoded therein, sending data 478 at an output of the demodulator 184(1). For example, the data 478 may comprise the information that was conveyed by the analog signals associated with the first stream that was representative of a narrow channel 332.

The wide channel module 404 receives at an input the second stream comprising second channel samples 440(1) and the third stream comprising third channel samples 440(2) after filtering. The wide channel module 404 comprises pairs of frequency translators 446. Each frequency translator 446 comprises an input that receives channel samples 440 and provides at an output frequency translated samples that have had their frequencies translated by plus or minus the sample frequency divided by four.

In the figure, each frequency translator 446 is depicted as a mixer 442 that comprises a first input and a second input. The first input receives the channel samples 440 and the second input receives a signal at a reference frequency. For example, the reference frequency may be one-quarter (¼)

the sampling frequency. The mixer 442 comprises an output that sends output samples that are representative of the product or multiplication of the signals presented at the inputs. With regard to samples, the frequency translator 446 may implement a multiplication operation between specified values of the input samples and a specified mixing sequence. The computationally efficient approach of frequency translation without multiplication may be utilized in which the real (in-phase) mixing sequence is cos(((pi)(n))/2) and the quadrature companion is −sin(((pi)(n))/2). Instead of performing explicit multiplication operations, the change in frequency may be accomplished by modifying the sign of the sample using a mixing sequence. The mixing sequence may be fixed and repeating, and may be used to selectively modify the samples without multiplication, introducing the frequency translation.

A first frequency translator 446 accepts at an input the second stream comprising second channel samples 440(1) and applies a positive frequency translation to generate first translated samples at an output. In this illustration, the first frequency translator 446 is represented by a lower band mixer 442(1).

A second frequency translator 446 accepts at an input the third stream comprising third channel samples 440(2) and applies a negative frequency translation to generate second translated samples at an output. In this illustration, the second frequency translator 446 is represented by an upper band mixer 442(2).

The first translated samples and the second translated samples are sent to inputs of an adder 444. The adder 444 sums the first translated samples and the second translated samples to generate reconstructed samples 448 at an output. The reconstructed samples 448 may be considered a "perfect reconstruction" comprising sufficient information to accurately reproduce the analog signals present in the wide channel 360.

The reconstructed samples 448 may be sent to an input of the beamformer module 460 that produces beamformed reconstructed samples 490. The beamformed reconstructed samples 490 sent by an output of the beamformer module 460 may be provided to an input of a demodulator 184(2). The demodulator 184(2) may process the beamformed reconstructed samples 490 to recover the data encoded therein, sending data 494 at an output of the demodulator 184(2). For example, the data 494 may comprise the information that was conveyed by the analog signals associated with the wide channel 360.

The beamformer module 460 implements one or more beamforming algorithms. The beamforming algorithms may apply changes to the values of the samples provided as input to the beamformer module 460 that introduce phase, amplitude, or other changes to samples to produce beamforming effects at specified frequencies to exhibit gain or directionality by introducing constructive or destructive interference. A beamforming effect allows the PAA 172 to be electronically "steered", producing gain in various directions with respect to the PAA 172 without physically moving the PAA 172. For example, the beamforming effect may be used to produce a "beam" or lobe that exhibits gain. Signals received from within the beam may exhibit a greater amplitude than signals outside of the beam. Beamforming may be used to preferentially receive signals from particular locations, reduce the amplitude of unwanted signals from another direction, and so forth. By processing the input samples to the beamformer, one or more beams may be manifested, up to the limit of the hardware to perform the necessary calculations. This provides great flexibility during operation.

Figure 5:
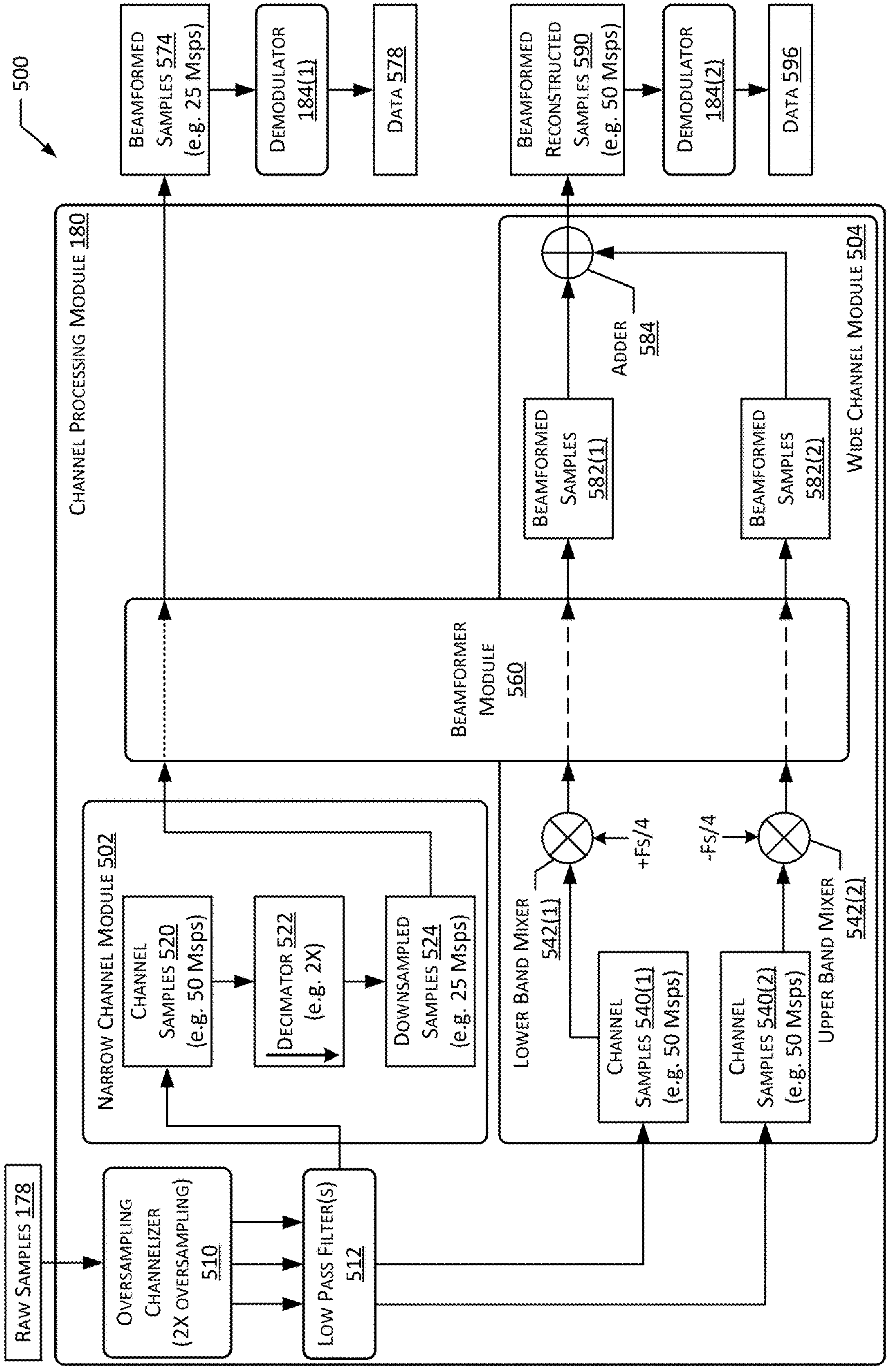
FIG. 5 illustrates a block diagram of a second architecture of a channel processing module, according to some implementations.

FIG. 5 illustrates at 500 a block diagram of a second architecture of a channel processing module 180, according to some implementations.

The CPM 180 in this implementation comprises an oversampling channelizer 510, narrow channel module 502, wide channel module 504, and beamformer module 560.

The oversampling channelizer 510 comprises an input that receives raw samples 178 obtained from signals received by a PAA 172. For example, the raw samples 178 may be delivered at a rate of 800 Msps.

The oversampling channelizer 510 may oversample the raw samples 178 by a factor of two relative to a sampling frequency of the raw samples 178 to generate streams of channel samples. Each stream may comprise samples that are associated with a particular channel 330. In the implementation shown, the oversampling channelizer 510 may generate three streams: a first stream comprises first channel samples 520, a second stream comprises second channel samples 540(1), and a third stream comprises third channel samples 540(2). The first stream of first channel samples 520 is provided to an input of a narrow channel module 502.

In some implementations, the oversampling channelizer 510 may implement the non-maximally decimated M-path polyphase analysis and synthesis channelizer. (See Harris, et al, "Filter banks for software defined radio".) In some implementations, cascaded polyphase filters with a Nyquist filter may be used, such as cascade non-maximally decimated filter banks. (See Harris, et, al, "Cascade Non-Maximally Decimated Filter Banks Form Efficient Variable Bandwidth Filters for Wideband Digital Transceivers".)

Output from the oversampling channelizer 510 may be processed by one or more low pass filters (LPFs) 512. In one implementation, the LPFs 512 may set every other sample coefficient of incoming samples to zero. For example, the value indicative of energy in every other sample may be set to zero.

The narrow channel module 502 receives at an input the first stream of first channel samples 520 after filtering and processes them with a decimator 522. The decimator 522 decimates samples received at an input by a factor of two and provides as output downsampled samples 524. For example, if the first channel samples 520 are delivered at a rate of 50 Msps, the downsampled samples 524 are output at a rate of 25 Msps. The downsampled samples 524 may be sent to an input of a beamformer module 560 that produces beamformed samples 574. The beamformed samples 574 sent by an output of the beamformer module 560 may be provided to an input of a demodulator 184(1). The demodulator 184(1) may process the beamformed samples 574 to recover the data encoded therein, sending data 578 at an output of the demodulator 184(1). For example, the data 578 may comprise the information that was conveyed by the analog signals associated with the first stream that was representative of a narrow channel 332.

The wide channel module 504 receives at an input the second stream comprising second channel samples 540(1) and the third stream comprising third channel samples 540(2) after filtering. The wide channel module 504 comprises pairs of frequency translators 446. Each frequency translator 446 comprises an input that receives channel samples 540 and provides at an output frequency translated samples that have had their frequencies translated by plus or minus the sample frequency divided by four.

In the figure, each frequency translator 446 is depicted as a mixer 542 that comprises a first input and a second input. The first input receives the channel samples 540 and the second input receives a reference frequency. For example, the reference frequency may be one-quarter (¼) the sampling frequency. The mixer 542 comprises an output that sends output samples that are representative of the product or multiplication of the signals presented at the inputs. With regard to samples, the frequency translator 446 may implement a multiplication operation between specified values of the input samples and a specified mixing sequence. The computationally efficient approach of frequency translation without multiplication may be utilized in which the real (in-phase) mixing sequence is cos(((pi)(n))/2) and the quadrature companion is −sin(((pi)(n))/2). Instead of performing explicit multiplication operations, the change in frequency may be accomplished by modifying the sign of the sample using a mixing sequence.

A first frequency translator 446 accepts at an input the second stream comprising second channel samples 540(1) and applies a positive frequency translation to them to generate first translated samples at an output. In this illustration, the first frequency translator 446 is represented by a lower band mixer 542(1).

A second frequency translator 446 accepts at an input the third stream comprising third channel samples 540(2) and applies a negative frequency translation to them to generate second translated samples at an output. In this illustration, the second frequency translator 446 is represented by an upper band mixer 542(2).

In this implementation, the first translated samples and the second translated samples are sent to inputs of the beamformer module 560. The beamformer module 560 implements one or more beamforming algorithms. The translated samples are processed by the beamformer module 560 to generate beamformed samples 582 that are sent by an output of the beamformer module 560. For example, the first translated samples are processed by the beamformer module 560 to generate first beamformed samples 582(1) and the second translated samples are processed by the beamformer module 560 to generate second beamformed samples 582(2).

The first beamformed samples 582(1) and the second beamformed samples 582(2) are sent to inputs of an adder 584. The adder 584 sums the first beamformed samples 582(1) and the second beamformed samples 582(2) to generate beamformed reconstructed samples 590 at an output. The beamformed reconstructed samples 590 may be considered a "perfect reconstruction" comprising sufficient information to accurately reproduce the analog signals present in the wide channel 360.

The beamformed reconstructed samples 590 sent by an output of the beamformer module 560 may be provided to an input of a demodulator 184(2). The demodulator 184(2) may process the beamformed reconstructed samples 590 to recover the data encoded therein, sending data 596 at an output of the demodulator 184(2). For example, the data 596 may comprise the information that was conveyed by the analog signals associated with the wide channel 360.

Figure 6:
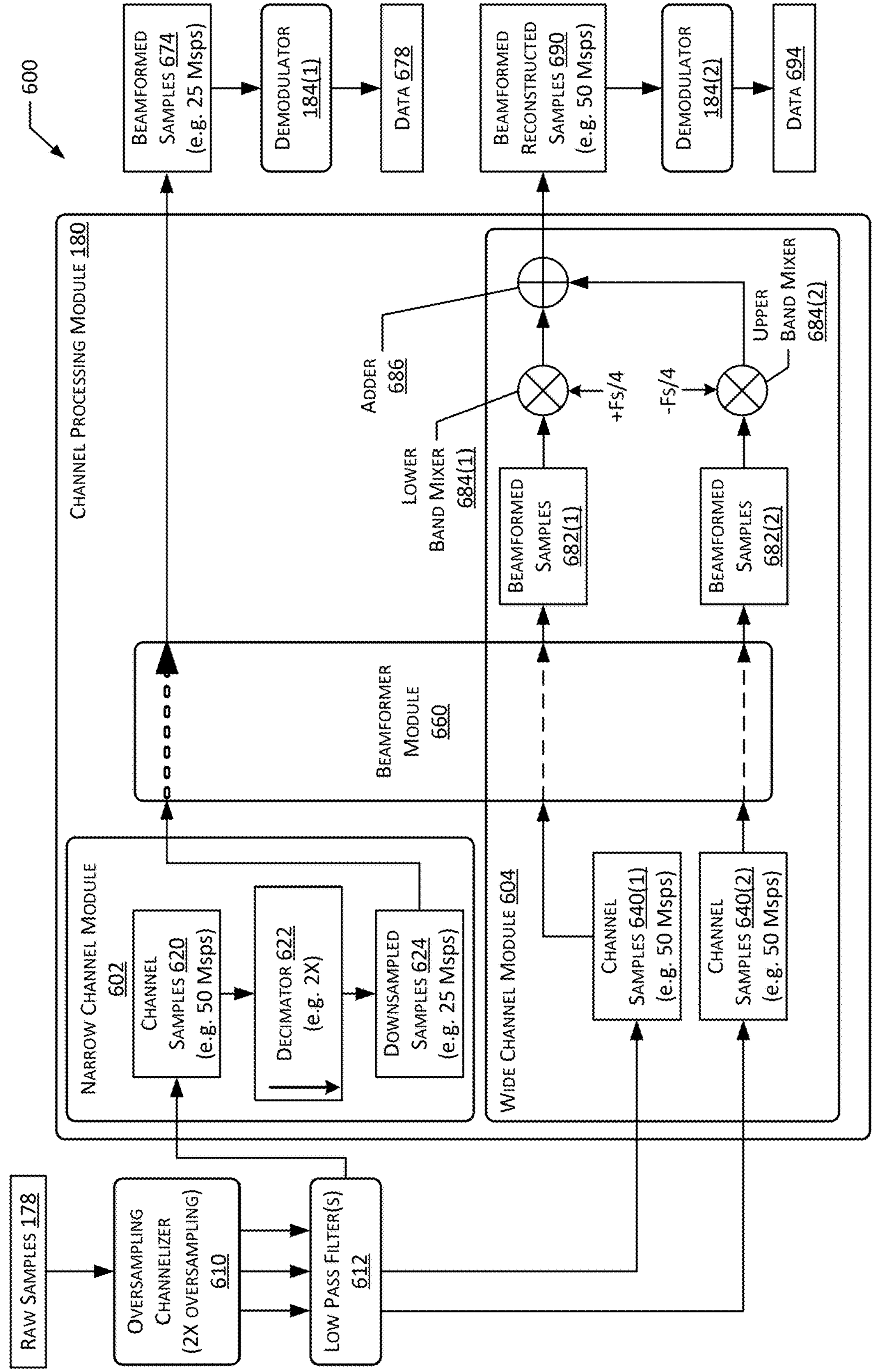
FIG. 6 illustrates a block diagram of a third architecture of a channel processing module, according to some implementations.

FIG. 6 illustrates at 600 a block diagram of a third architecture of a channel processing module 180, according to some implementations.

The CPM 180 in this implementation comprises an oversampling channelizer 610, narrow channel module 602, wide channel module 604, and beamformer module 660.

The oversampling channelizer 610 comprises an input that receives raw samples 178 obtained from signals received by a PAA 172. For example, the raw samples 178 may be delivered at a rate of 800 Msps.

The oversampling channelizer 610 may oversample the raw samples 178 by a factor of two relative to a sampling frequency of the raw samples 178 to generate streams of channel samples. Each stream may comprise samples that are associated with a particular channel 330. In the implementation shown, the oversampling channelizer 610 may generate three streams: a first stream comprises first channel samples 620, a second stream comprises second channel samples 640(1), and a third stream comprises third channel samples 640(2). The first stream of first channel samples 620 is provided to an input of a narrow channel module 602.

In some implementations, the oversampling channelizer 610 may implement the non-maximally decimated M-path polyphase analysis and synthesis channelizer. (See Harris, et al, "Filter banks for software defined radio".) In some implementations, cascaded polyphase filters with a Nyquist filter may be used, such as described as cascade non-maximally decimated filter banks. (See Harris, et, al, "Cascade Non-Maximally Decimated Filter Banks Form Efficient Variable Bandwidth Filters for Wideband Digital Transceivers".)

Output from the oversampling channelizer 610 may be processed by one or more low pass filters (LPFs) 612. In one implementation, the LPFs 612 may set every other sample coefficient of incoming samples to zero. For example, the value indicative of energy in every other sample may be set to zero.

The narrow channel module 602 receives at an input the first stream of first channel samples 620 after filtering and processes them with a decimator 622. The decimator 622 decimates samples received at an input by a factor of two and provides as output downsampled samples 624. For example, if the first channel samples 620 are delivered at a rate of 50 Msps, the downsampled samples 624 are output at a rate of 25 Msps. The downsampled samples 624 may be sent to an input of a beamformer module 660 that produces beamformed samples 674. The beamformed samples 674 sent by an output of the beamformer module 660 may be provided to an input of a demodulator 184(1). The demodulator 184(1) may process the beamformed samples 674 to recover the data encoded therein, sending data 678 at an output of the demodulator 184(1). For example, the data 678 may comprise the information that was conveyed by the analog signals associated with the first stream that was representative of a narrow channel 332.

The wide channel module 604 receives at an input the second stream comprising second channel samples 640(1) and the third stream comprising third channel samples 640(2) after filtering.

In this implementation, the second channel samples 640(1) and the third channel samples 640(2) are sent to inputs of the beamformer module 660. The beamformer module 660 implements one or more beamforming algorithms. The channel samples 640 are processed by the beamformer module 660 to generate beamformed samples 682 that are sent by an output of the beamformer module 660. For example, the first channel samples 640(1) are processed by the beamformer module 660 to generate first beamformed samples 682(1) and the second channel samples 640(2) are processed by the beamformer module 660 to generate second beamformed samples 682(2).

The first beamformed samples 682(1) and the second beamformed samples 682(2) are sent to respective inputs of the frequency translators 446. The wide channel module 604 comprises pairs of frequency translators 446. Each frequency translator 446 comprises an input that receives beamformed samples 682 and provides at an output frequency translated samples that have been translated by plus or minus one-quarter of the sampling frequency.

In the figure, each frequency translator 446 is depicted as a mixer 684 that comprises a first input and a second input. The first input receives the beamformed samples 682 and the second input receives a reference frequency. For example, the reference frequency may be one-quarter (¼) the sampling frequency. The mixer 684 comprises an output that sends output samples that are representative of the product or multiplication of the signals presented at the inputs. With regard to samples, the frequency translator 446 may implement a multiplication operation between specified values of the input samples and a specified mixing sequence. The computationally efficient approach of frequency translation without multiplication may be utilized in which the real (in-phase) mixing sequence is cos(((pi)(n))/2) and the quadrature companion is −sin(((pi)(n))/2). Instead of performing explicit multiplication operations, the change in frequency may be accomplished by modifying the sign of the sample using a mixing sequence.

A first frequency translator 446 accepts at an input the first beamformed samples 682(1) and applies a positive frequency translation to them to generate first translated samples at an output. In this illustration, the first frequency translator 446 is represented by a lower band mixer 684(1).

A second frequency translator 446 accepts at an input the second beamformed samples 682(2) and applies a negative frequency translation to them to generate second translated samples at an output. In this illustration, the second frequency translator 446 is represented by an upper band mixer 684(2).

The first translated samples and the second translated samples are sent to inputs of an adder 686. The adder 686 sums the first translated samples and the second translated samples to generate beamformed reconstructed samples 690 at an output. The beamformed reconstructed samples 690 may be considered a "perfect reconstruction" comprising sufficient information to accurately reproduce the analog signals present in the wide channel 360.

The beamformed reconstructed samples 690 sent by an output of the adder 686 may be provided to an input of a demodulator 184(2). The demodulator 184(2) may process the beamformed reconstructed samples 690 to recover the data encoded therein, sending data 694 at an output of the demodulator 184(2). For example, the data 694 may comprise the information that was conveyed by the analog signals associated with the wide channel 360.

Figure 7:
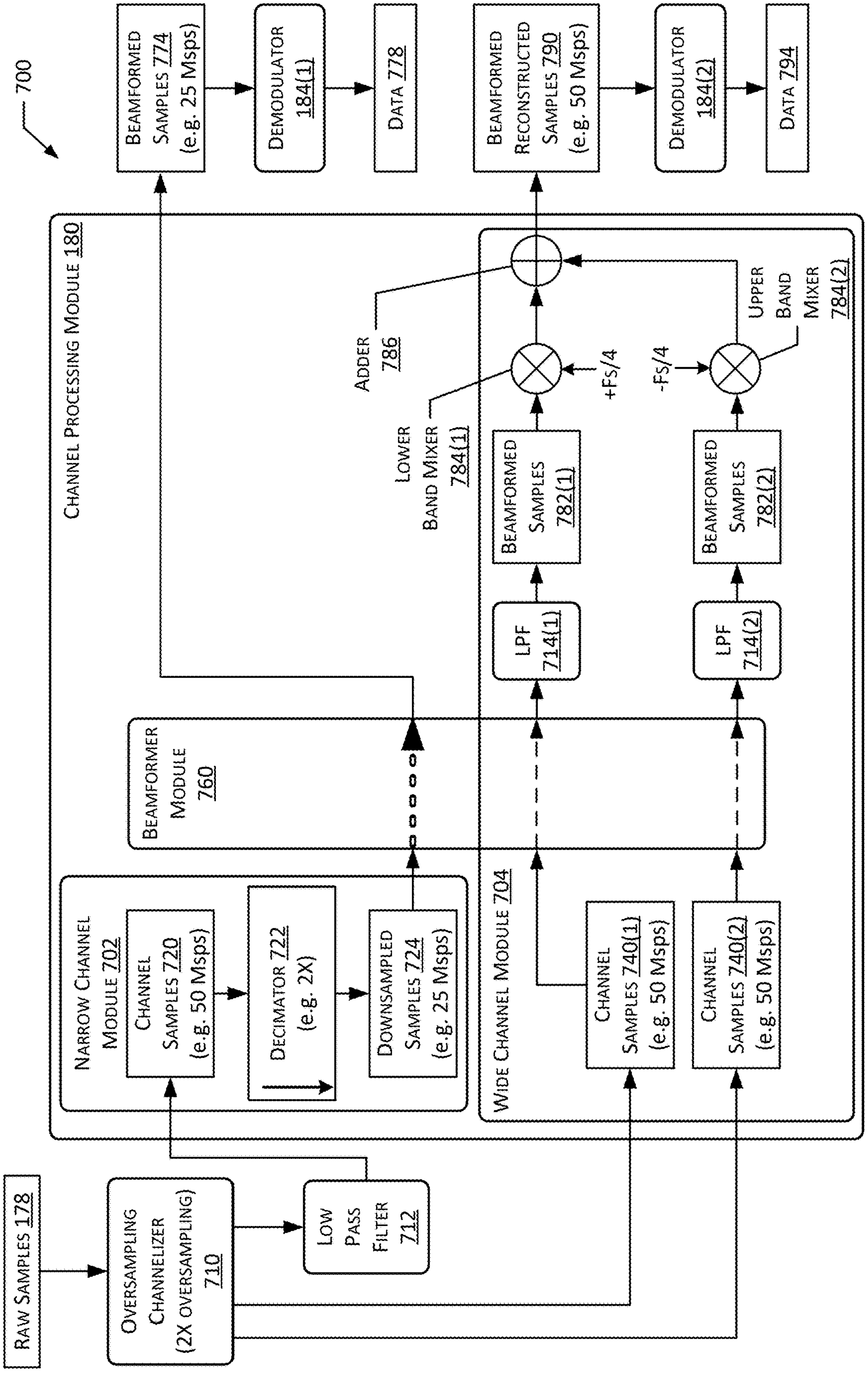
FIG. 7 illustrates a block diagram of a fourth architecture of a channel processing module, according to some implementations.

FIG. 7 illustrates at 700 a block diagram of a fourth architecture of a channel processing module 180, according to some implementations.

The CPM 180 in this implementation comprises an oversampling channelizer 710, narrow channel module 702, wide channel module 704, and beamformer module 760.

The oversampling channelizer 710 comprises an input that receives raw samples 178 obtained from signals received by a PAA 172. For example, the raw samples 178 may be delivered at a rate of 800 Msps.

The oversampling channelizer 710 may oversample the raw samples 178 by a factor of two relative to a sampling frequency of the raw samples 178 to generate streams of channel samples. Each stream may comprise samples that are associated with a particular channel 330. In the implementation shown, the oversampling channelizer 710 may generate three streams: a first stream comprises first channel samples 720, a second stream comprises second channel samples 740(1), and a third stream comprises third channel samples 740(2). The first stream of first channel samples 720 is provided to an input of a narrow channel module 702.

In some implementations, the oversampling channelizer 710 may implement the non-maximally decimated M-path polyphase analysis and synthesis channelizer. (See Harris, et al, "Filter banks for software defined radio".) In some implementations, cascaded polyphase filters with a Nyquist filter may be used, such as cascade non-maximally decimated filter banks. (See Harris, et, al, "Cascade Non-Maximally Decimated Filter Banks Form Efficient Variable Bandwidth Filters for Wideband Digital Transceivers".)

The narrow channel module 702 receives at an input the first stream of first channel samples 720 after filtering by a low pass filter (LPF) 712 and processes them with a decimator 722. In one implementation, the LPFs 712 may set every other sample coefficient of incoming samples to zero. For example, the value indicative of energy in every other sample may be set to zero.

The decimator 722 decimates samples received at an input by a factor of two and provides as output downsampled samples 724. For example, if the first channel samples 720 are delivered at a rate of 50 Msps, the downsampled samples 724 are output at a rate of 25 Msps. The downsampled samples 724 may be sent to an input of a beamformer module 760 that produces beamformed samples 774. The beamformed samples 774 sent by an output of the beamformer module 760 may be provided to an input of a demodulator 184(1). The demodulator 184(1) may process the beamformed samples 774 to recover the data encoded therein, sending data 778 at an output of the demodulator 184(1). For example, the data 778 may comprise the information that was conveyed by the analog signals associated with the first stream that was representative of a narrow channel 332.

The wide channel module 704 receives at an input the second stream comprising second channel samples 740(1) and the third stream comprising third channel samples 740(2).

In this implementation, the second channel samples 740 (1) and the third channel samples 740(2) are sent to inputs of the beamformer module 760. The beamformer module 760 implements one or more beamforming algorithms. The channel samples 740 are processed by the beamformer module 760 to generate beamformed samples 782 that are sent by an output of the beamformer module 760. For example, the second channel samples 740(1) are processed by the beamformer module 760 to generate first beamformed samples 782(1) and the third channel samples 740(2) are processed by the beamformer module 760 to generate second beamformed samples 782(2).

Output from the beamformer module 760 that is associated with the wide channel module 704 may be processed by one or more low pass filters (LPFs) 714. For example, the output from the beamformer module 760 that is based on the second channel samples 740(1) may be processed by a first LPF 714(1) to provide the beamformed samples 782(1). Continuing the example, the output from the beamformer module 760 that is based on the third channel samples 740(2) may be processed by a second LPF 714(2) to provide the beamformed samples 782(2). In one implementation, the LPFs 714 may set every other sample coefficient of incoming samples to zero. For example, the value indicative of energy in every other sample may be set to zero.

The filtered first beamformed samples 782(1) and the filtered second beamformed samples 782(2) are sent to respective inputs of the frequency translators 446. The wide channel module 704 comprises pairs of frequency translators 446. Each frequency translator 446 comprises an input that receives beamformed samples 782 and provides at an output frequency translated samples that have been translated by plus or minus one-quarter of the sampling frequency.

In the figure, each frequency translator 446 is depicted as a mixer 784 that comprises a first input and a second input. The first input receives the beamformed samples 782 and the second input receives a reference frequency. For example, the reference frequency may be one-quarter (¼) the sampling frequency. The mixer 784 comprises an output that sends output samples that are representative of the product or multiplication of the signals presented at the inputs. With regard to samples, the frequency translator 446 may implement a multiplication operation between specified values of the input samples and a specified mixing sequence. The computationally efficient approach of frequency translation without multiplication may be utilized in which the real (in-phase) mixing sequence is cos(((pi)(n))/2) and the quadrature companion is −sin(((pi)(n))/2). Instead of performing explicit multiplication operations, the change in frequency may be accomplished by modifying the sign of the sample using a mixing sequence.

A first frequency translator 446 accepts at an input the first beamformed samples 782(1) and applies a positive frequency translation to them to generate first translated samples at an output. In this illustration, the first frequency translator 446 is represented by a lower band mixer 784(1).

A second frequency translator 446 accepts at an input the second beamformed samples 782(2) and applies a negative frequency translation to them to generate second translated samples at an output. In this illustration, the second frequency translator 446 is represented by an upper band mixer 784(2).

The first translated samples and the second translated samples are sent to inputs of an adder 786. The adder 786 sums the first translated samples and the second translated samples to generate beamformed reconstructed samples 790 at an output. The beamformed reconstructed samples 790 may be considered a "perfect reconstruction" comprising sufficient information to accurately reproduce the analog signals present in the wide channel 360.

The beamformed reconstructed samples 790 sent by an output of the adder 786 may be provided to an input of a demodulator 184(2). The demodulator 184(2) may process the beamformed reconstructed samples 790 to recover the data encoded therein, sending data 794 at an output of the demodulator 184(2). For example, the data 794 may comprise the information that was conveyed by the analog signals associated with the wide channel 360.

Figure 8:
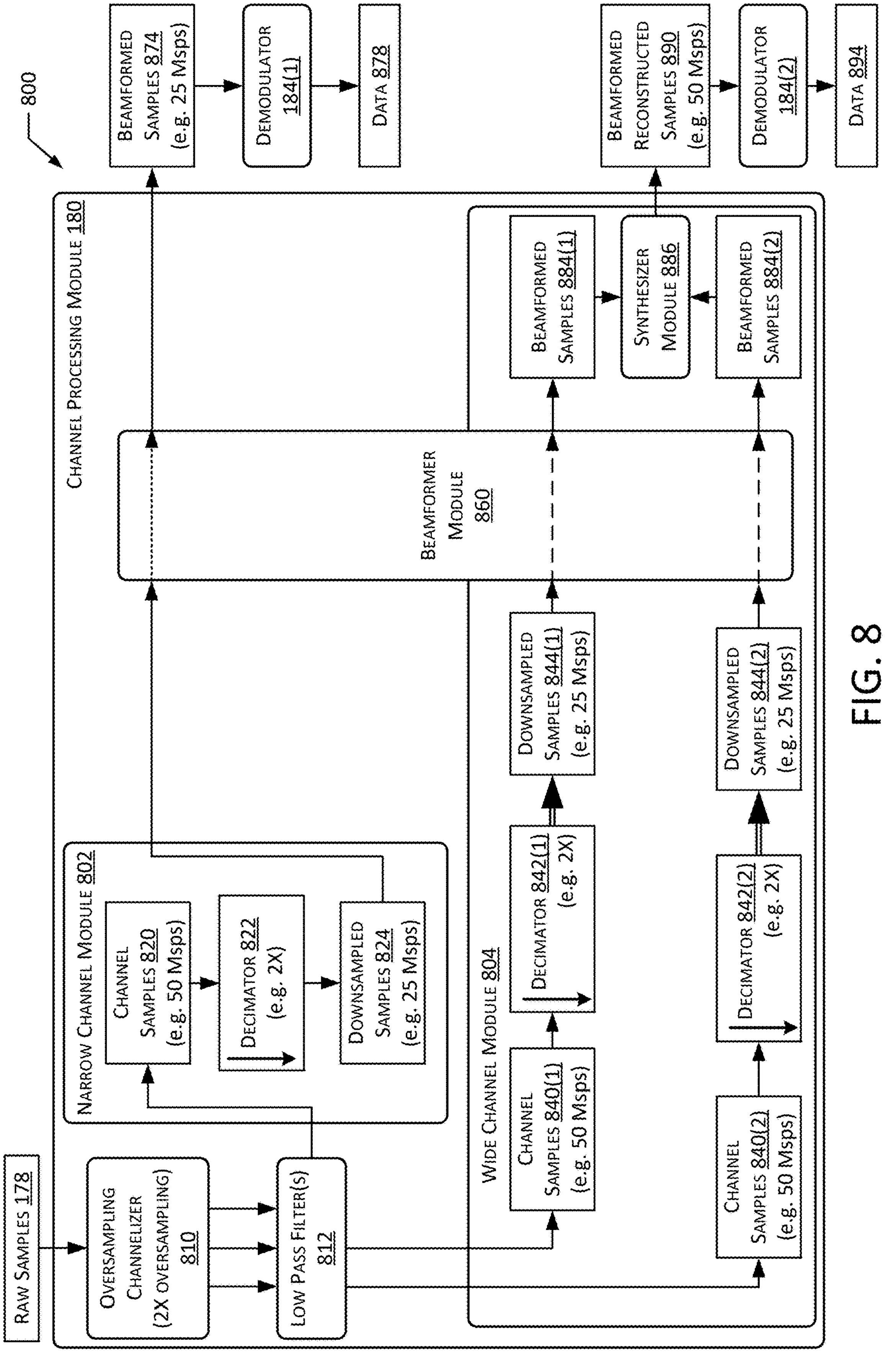
FIG. 8 illustrates a block diagram of a fifth architecture of a channel processing module, according to some implementations.

FIG. 8 illustrates at 800 a block diagram of a fifth architecture of a channel processing module 180, according to some implementations.

The CPM 180 in this implementation comprises an oversampling channelizer 810, narrow channel module 802, wide channel module 804, and beamformer module 860.

The oversampling channelizer 810 comprises an input that receives raw samples 178 obtained from signals received by a PAA 172. For example, the raw samples 178 may be delivered at a rate of 800 Msps.

The oversampling channelizer 810 may oversample the raw samples 178 by a factor of two relative to a sampling frequency of the raw samples 178 to generate streams of channel samples. Each stream may comprise samples that are associated with a particular channel 330. In the implementation shown, the oversampling channelizer 810 may generate three streams: a first stream comprises first channel samples 820, a second stream comprises second channel samples 840(1), and a third stream comprises third channel samples 840(2). The first stream of first channel samples 820 is provided to an input of a narrow channel module 802.

In some implementations, the oversampling channelizer 810 may implement the non-maximally decimated M-path polyphase analysis and synthesis channelizer. (See Harris, et al, "Filter banks for software defined radio".) In some implementations, cascaded polyphase filters with a Nyquist filter may be used, such as described as cascade non-maximally decimated filter banks. (See Harris, et, al, "Cascade Non-Maximally Decimated Filter Banks Form Efficient Variable Bandwidth Filters for Wideband Digital Transceivers".)

Output from the oversampling channelizer 810 may be processed by one or more low pass filters (LPFs) 812. In one implementation, the LPFs 812 may set every other sample coefficient of incoming samples to zero. For example, the value indicative of energy in every other sample may be set to zero.

The narrow channel module 802 receives at an input the first stream of first channel samples 820 after filtering and processes them with a decimator 822. The decimator 822 decimates samples received at an input by a factor of two and provides as output downsampled samples 824. For example, if the first channel samples 820 are delivered at a rate of 50 Msps, the downsampled samples 824 are output at a rate of 25 Msps. The downsampled samples 824 may be sent to an input of a beamformer module 860 that produces beamformed samples 874. The beamformed samples 874 sent by an output of the beamformer module 860 may be provided to an input of a demodulator 184(1). The demodulator 184(1) may process the beamformed samples 874 to recover the data encoded therein, sending data 878 at an output of the demodulator 184(1). For example, the data 878 may comprise the information that was conveyed by the analog signals associated with the first stream that was representative of a narrow channel 332.

The wide channel module 804 receives at an input the second stream comprising second channel samples 840(1) and the third stream comprising third channel samples 840(2) after filtering.

In this implementation, channel samples 840 are sent to inputs of respective decimators 842. For example, the second channel samples 840(1) are sent to inputs of a first decimator 842(1) and the third channel samples 840(2) are sent to inputs of a second decimator 842(2). Each decimator 842 decimates samples received at an input by a factor of two and provides as output downsampled samples 844. For example, the output of the first decimator 842(1) sends first downsampled samples 844(1) and the output of the second decimator 842(2) sends second downsampled samples 844(2).

The downsampled samples 844 are sent to inputs of the beamformer module 860. The beamformer module 860 implements one or more beamforming algorithms. The downsampled samples 844 are processed by the beamformer module 860 to generate beamformed samples 884 that are sent by an output of the beamformer module 860. For example, the first downsampled samples 844(1) are processed by the beamformer module 860 to generate first beamformed samples 884(1) and the second downsampled samples 844(2) are processed by the beamformer module 860 to generate second beamformed samples 884(2).

The first beamformed samples 884(1) and the second beamformed samples 884(2) may then be processed by a synthesizer module 886 that generates beamformed reconstructed samples 890 that are sent at an output of the synthesizer module 886. In some implementations the synthesizer module 886 may comprise a perfect reconstruction synthesizer. In some implementations the synthesizer module 886 may implement a pair of frequency translators 446. Each frequency translator 446 comprises an input that receives beamformed samples 884 and provides at an output frequency translated samples that have been translated by one-quarter of the sampling frequency. A first frequency translator 446 accepts at an input the first beamformed samples 884(1) and applies a positive frequency translation to them to generate first translated samples. A second frequency translator 446 accepts at an input the second beamformed samples 884(2) and applies a negative frequency translation to them to generate second translated samples. The frequency translators 446 may implement the frequency translation without multiplication, as discussed previously. The first translated samples and the second translated samples may be summed to generate the beamformed reconstructed samples 890. The beamformed reconstructed samples 890 may be considered a "perfect reconstruction" comprising sufficient information to accurately reproduce the analog signals present in the wide channel 360.

The beamformed reconstructed samples 890 sent by an output of the synthesizer module 886 may be provided to an input of a demodulator 184(2). The demodulator 184(2) may process the beamformed reconstructed samples 890 to recover the data encoded therein, sending data 894 at an output of the demodulator 184(2). For example, the data 894 may comprise the information that was conveyed by the analog signals associated with the wide channel 360.

In some implementations one or more of the techniques or systems described herein may be applied to other antenna configurations. In one implementation, instead of a phased array antenna 172, the communication system 120 may comprise a non-phased array antenna and beamforming may be omitted.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver or other global navigation spacecraft system may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

an oversampling channelizer comprising:

- a first input to receive raw samples acquired at a raw sample rate, wherein the raw samples are representative of one or more analog signals received using a phased array antenna; and
- a channelizer output, wherein the channelizer output sends a first stream associated with a first signal bandwidth, a second stream associated with the first signal bandwidth, and a third stream associated with a second signal bandwidth, wherein each one of the first stream, the second stream and the third stream comprises channel samples that are associated with a specified channel frequency range and are sampled at a sampling frequency that is oversampled from the raw samples by a factor of two relative to the raw sample rate, and wherein each one of the first stream, the second stream and the third stream is filtered by a low pass filter;

a first channel module comprising:

- a first frequency translator comprising:
  - a first frequency translator input that is connected to the channelizer output and receives the first stream comprising first channel samples; and
  - a first frequency translator output that sends first frequency translated samples, wherein each sample of the first channel samples is frequency translated up by one-quarter the sampling frequency;

a second frequency translator comprising:

a second frequency translator input that is connected to the channelizer output and receives the second stream comprising second channel samples; and a second frequency translator output that sends second frequency translated samples, wherein each sample of the second channel samples is frequency translated down by one-quarter the sampling frequency; and an adder comprising:

a first adder input that is connected to the first frequency translator output;

a second adder input that is connected to the second frequency translator output; and an adder output to send reconstructed samples comprising a sum of the first frequency translated samples and the second frequency translated samples; and a beamformer module comprising:

a first beamformer input to receive the reconstructed samples; and a first beamformer output to send first beamformed samples, wherein the first beamformed samples are generated by applying one or more beamforming operations to the reconstructed samples.

2. The system of claim 1, further comprising:

a second channel module comprising:

a first decimator comprising:

a decimator input that is connected to the channelizer output and accepts the third stream comprising third channel samples;

a decimator output that sends downsampled third channel samples, wherein the downsampled third channel samples are downsampled from the third channel samples by a factor of two; and the beamformer module further comprising:

a second beamformer input to receive the downsampled third channel samples; and a second beamformer output to send second beamformed samples, wherein the second beamformed samples are generated by applying one or more beamforming operations to the downsampled third channel samples.

3. The system of claim 1, wherein the second signal bandwidth is at most one-half of the first signal bandwidth.

4. The system of claim 1, further comprising:

one or more demodulators, comprising:

a first demodulator input connected to the first beamformer output; and a first demodulator output to send first data based on a demodulation of the first beamformed samples.

5. A system comprising:

an oversampling channelizer comprising:

a channelizer input to receive raw samples acquired at a raw sample rate, wherein the raw samples are representative of one or more analog signals received using a phased array antenna; and a channelizer output, wherein the channelizer output sends a first stream associated with a first signal bandwidth, a second stream associated with the first signal bandwidth, and a third stream associated with a second signal bandwidth, each stream comprising channel samples that are associated with a specified channel frequency range and are sampled at a sampling frequency that is oversampled from the raw samples by a factor of two relative to the raw sample rate;

a first module comprising;

a first input that receives the first stream comprising first channel samples;

a second input that receives the second stream comprising second channel samples;

a first frequency translator that applies a positive frequency translation to first input samples to generate first translated samples, wherein the first input samples comprise or are based on the first channel samples;

a second frequency translator that applies a negative frequency translation to second input samples to generate second translated samples, wherein the second input samples comprise or are based on the second channel samples;

an adder that sums third input samples and fourth input samples to generate reconstructed samples, wherein:

the third input samples comprise or are based on the first channel samples, and the fourth input samples comprise or are based on the second channel samples; and a beamformer module that applies one or more beamforming operations to fifth input samples to generate first beamformed samples.

6. The system of claim 5, wherein:

the channelizer output is filtered by a low pass filter;

the first input samples consist of the first channel samples;

the second input samples consist of the second channel samples;

the third input samples consist of the first translated samples;

the fourth input samples consist of the second translated samples; and the fifth input samples comprise the reconstructed samples.

7. The system of claim 5, further comprising:

one or more demodulators that receive the first beamformed samples and generate first data based on a demodulation of the first beamformed samples.

8. The system of claim 5, wherein:

the channelizer output is filtered by a low pass filter;

the first input samples consist of the first channel samples;

the second input samples consist of the second channel samples; and the fifth input samples comprise the first translated samples; and wherein:

the beamformer module applies further one or more beamforming operations to the second translated samples to generate second beamformed samples; and wherein:

the third input samples consist of the first beamformed samples; and the fourth input samples consist of the second beamformed samples.

9. The system of claim 5, wherein:

the channelizer output is filtered by a low pass filter, and the fifth input samples consist of the first channel samples; and wherein:

the beamformer module further applies one or more beamforming operations to the second channel samples to generate second beamformed samples; and wherein:

the first input samples consist of the first beamformed samples;

the second input samples consist of the second beamformed samples;

the third input samples consist of the first translated samples; and the fourth input samples consist of the second translated samples.

10. The system of claim 5, wherein:

the fifth input samples consist of the first channel samples; and wherein:

the beamformer module further applies a first low pass filter to the first beamformed samples to generate filtered first beamformed samples;

the beamformer module further applies one or more beamforming operations to the second channel samples to generate second beamformed samples;

the beamformer module further applies a second low pass filter to generate filtered second beamformed samples; and wherein:

the first input samples consist of the filtered first beamformed samples;

the second input samples consist of the filtered second beamformed samples;

the third input samples consist of the first translated samples; and the fourth input samples consist of the second translated samples.

11. The system of claim 5, wherein the third stream of the channelizer output is filtered by a low pass filter, and further comprising:

a second module comprising:

a first decimator that receives the third stream comprising third channel samples and generates downsampled third channel samples, wherein the downsampled third channel samples are downsampled from the third channel samples by a factor of two; and the beamformer module further applies one or more beamforming operations to the downsampled third channel samples to generate second beamformed samples.

12. The system of claim 5, wherein the second signal bandwidth is at most one-half of the first signal bandwidth.

13. The system of claim 5, wherein:

the first frequency translator comprises a first mixer having a first mixer input that receives the first input samples and a second mixer input to receive a reference frequency that is a negative one-quarter of the sampling frequency; and the second frequency translator comprises a second mixer having a third mixer input that receives the second input samples and a fourth mixer input to receive a reference frequency that is a positive one-quarter of the sampling frequency.

14. The system of claim 5, wherein:

the first frequency translator comprises a first mixer having a first mixer input that receives the first input samples and a second mixer input to receive a first mixing sequence; and the second frequency translator comprises a second mixer having a third mixer input that receives the second input samples and a fourth mixer input to receive a second mixing sequence.

15. A computer-implemented method comprising:

receiving, at an oversampling channelizer, raw samples acquired at a raw sample rate, wherein the raw samples are representative of one or more analog signals received using a phased array antenna;

generating, with the oversampling channelizer by oversampling the raw samples by a factor of two relative to the raw sample rate:

a first stream comprising first channel samples associated with a first signal bandwidth and a first specified channel frequency range, a second stream comprising second channel samples associated with the first signal bandwidth and a second specified channel frequency range, and a third stream comprising third channel samples associated with a second signal bandwidth and a third specified channel frequency range;

processing first input samples comprising the first channel samples or samples based on the first channel samples using a first frequency translator that applies a positive frequency translation to the first input samples to generate first translated samples;

processing second input samples comprising the second channel samples or samples based on the second channel samples using a second frequency translator that applies a negative frequency translation to the second input samples to generate second translated samples;

adding third input samples and fourth input samples to generate reconstructed samples, wherein the third input samples comprise or are based on the first channel samples, and the fourth input samples comprise or are based on the second channel samples; and performing one or more beamforming operations to fifth input samples to generate first beamformed samples.

16. The computer-implemented method of claim 15, further comprising:

filtering output of the oversampling channelizer using a low pass filter, wherein:

the first input samples consist of the first channel samples;

the second input samples consist of the second channel samples;

the third input samples consist of the first translated samples;

the fourth input samples consist of the second translated samples; and the fifth input samples comprise the reconstructed samples.

17. The computer-implemented method of claim 15, further comprising:

filtering output of the oversampling channelizer using a low pass filter, wherein:

the first input samples consist of the first channel samples;

the second input samples consist of the second channel samples;

the fifth input samples comprise the first translated samples; and further comprising:

performing one or more beamforming operations to the second translated samples to generate second beamformed samples; and wherein:

the third input samples consist of the first beamformed samples; and the fourth input samples consist of the second beamformed samples.

18. The computer-implemented method of claim 15, further comprising:

filtering output of the oversampling channelizer using a low pass filter, wherein:

the fifth samples consist of the first channel samples; and further comprising:

performing one or more beamforming operations to the second channel samples to generate second beamformed samples, wherein:

the first input samples consist of the first beamformed samples;

the second input samples consist of the second beamformed samples;

the third input samples consist of the first translated samples; and the fourth input samples consist of the second translated samples.

19. The computer-implemented method of claim 15, wherein the fifth input samples consist of the first channel samples; and wherein the method further comprises:

filtering the first beamformed samples with a first low pass filter to generate filtered first beamformed samples;

performing one or more beamforming operations to the second channel samples to generate second beamformed samples; and filtering the second beamformed samples with a second low pass filter to generate filtered second beamformed samples, wherein:

the first input samples consist of the filtered first beamformed samples;

the second input samples consist of the filtered second beamformed samples;

the third input samples consist of the first translated samples; and the fourth input samples consist of the second translated samples.

20. The computer-implemented method of claim 15, further comprising:

filtering the third stream of the oversampling channelizer using a low pass filter to generate a filtered third stream;

processing the filtered third stream using a first decimator that downsamples the third channel samples by a factor of two to generate downsampled third channel samples; and performing one or more beamforming operations to the downsampled third channel samples to generate second beamformed samples.

* * * * *